United States Patent [19]

Honig

[11] 4,375,491

[45] Mar. 1, 1983

[54] ROLL-UP FOLD-UP SLUICE APPARATUS

[76] Inventor: Steven Honig, P.O. Box 2689, Homer, Ak. 99603

[21] Appl. No.: 297,782

[22] Filed: Aug. 31, 1981

[51] Int. Cl.[3] .......................... B03B 5/06; B32B 3/30

[52] U.S. Cl. .................................... 428/167; 209/485; 209/506; 428/182; 428/192; 428/906

[58] Field of Search ............... 428/167, 182, 184, 186, 428/192, 906; 209/506, 458, 485

[56] References Cited

U.S. PATENT DOCUMENTS 4,215,488 8/1980 Donabedian ........................ 428/182

*Primary Examiner*—Paul J. Thibodeau

*Attorney, Agent, or Firm*—Kolisch, Hartwell & Dickinson

[57] ABSTRACT

A roll-up fold-up sluice apparatus for use in separating sediment by water flow. The apparatus includes an elongate flexible mat having formed, in a central portion therein, a plurality of longitudinally spaced riffles which extend laterally with respect to the mat's long axis, and which define associated ridges and channels on the mat's upper and lower sides, respectively. The riffles are longitudinally spaced by increasing increments progressing in one longitudinal direction in the mat and are sized and shaped to accommodate a regular ridge-to-channel nesting when the mat is rolled up in that direction. A pair of flaps joined to opposite sides of the mat's central portion can be folded between folded-up positions to form the sides for the apparatus, and folded-down positions to enable rolling up.

6 Claims, 8 Drawing Figures

FIG. 5
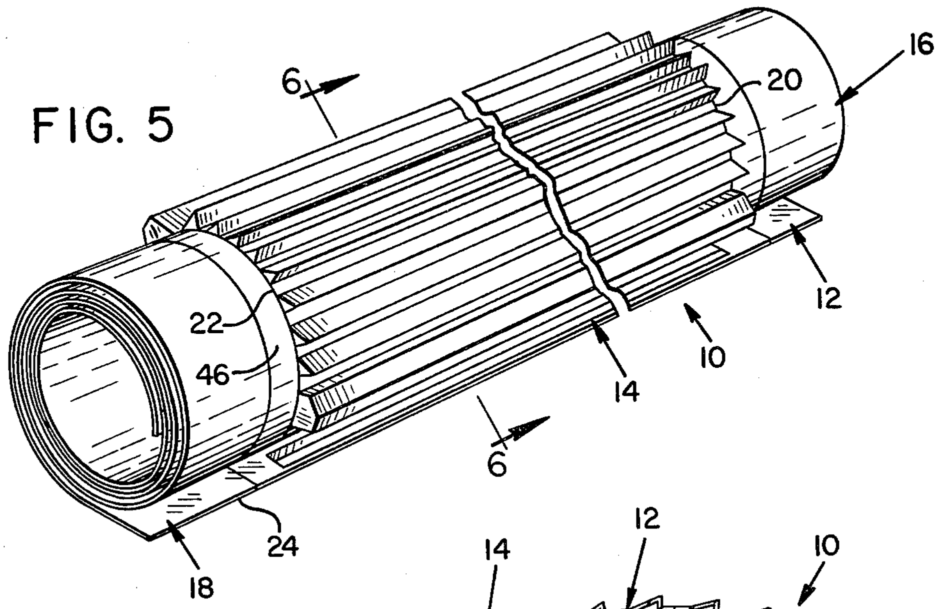
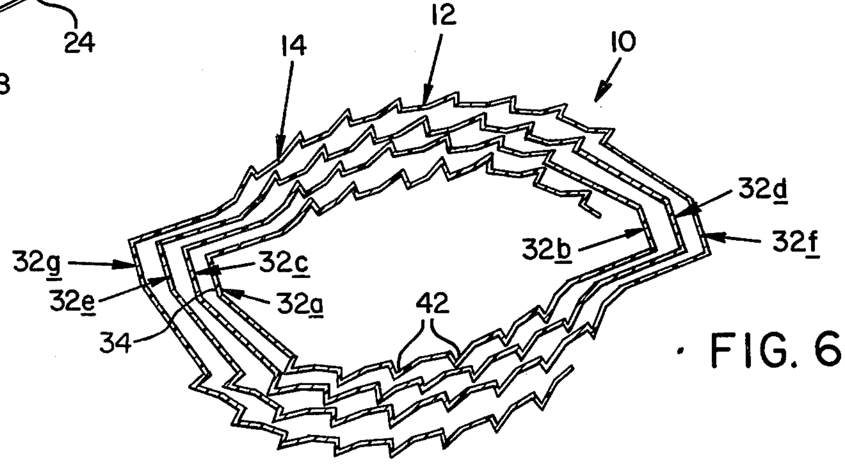
FIG. 6
FIG. 2
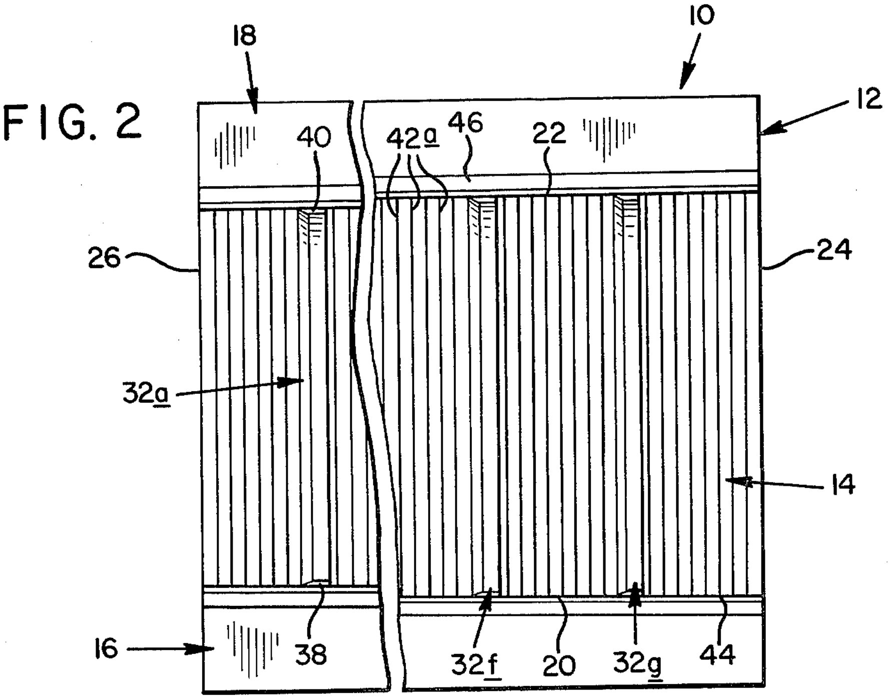

ROLL-UP FOLD-UP SLUICE APPARATUS

BACKGROUND AND SUMMARY

The present invention relates to a sluice box or apparatus, for use in separating sediment by water flow, and in particular, to a sluice box which can be rolled up into a compact form for storage or carrying, and unrolled and folded for use.

The usual sluice box used by prospectors and the like includes a rigid structure having a riffled bottom member and a pair of sides rigidly secured to the member's side edges. With the sluice box placed in a stream bed, rocks, gravel and the like are carried by water flow over riffles in the bottom member, while heavier minerals such as gold collect on the downstream side of the riffles.

In modern prospecting, the prospector may need to carry the sluice box, along with his other supplies, a distance of many miles from the nearest road to the stream destination. With a view toward increased portability, modern sluice boxes are constructed of lightweight material, such as aluminum or rigid plastic, and may be disassemblable, for compact carrying into a number of component parts which may include brackets, small fasteners and the like. One problem associated with a disassemblable sluice box of this type is that the smaller components in the box tend to become misplaced with repeated assembly and disassembly. Further, the prospector must spend considerable time in disassembling and reassembling the box each time it is carried from place to place.

One object of the present invention is to provide a portable sluice apparatus which overcomes above-noted problems in prior art sluice boxes.

A more specific object of the invention is to provide such an apparatus which is formed as a single-piece, lightweight flexible article which can be rolled up for carrying.

A related object of the invention is to provide in such an apparatus, plural riffles which are dimensioned and longitudinally spaced for producing a regular interriffle nesting when the apparatus is rolled up.

The sluice apparatus of the present invention includes an elongate flexible mat having formed in a central portion therein, a plurality of longitudinally spaced riffles extending laterally with respect to the mat's long axis. The riffles define laterally extending ridges and channels on the mat's upper and lower sides, respectively, and are dimensioned and longitudinally spaced for accommodating a regular ridge-to-channel nesting when the mat is rolled up in one longitudinal direction.

In a preferred embodiment of the invention, the riffles have increasing lateral dimensions, and are spaced by increasing longitudinal increments, progressing in such direction. A pair of flaps flexibly disposed on opposite sides of the mat's central portion are foldable between folded-up positions to form the sides in the apparatus, and folded-down positions when the apparatus is to be rolled up. All components are formed as a single-piece molded article.

These and other objects and features of the present invention will become apparent when the following detailed description of preferred embodiments of the invention is read in conjunction with the drawings.

BRIEF DESCRIPTION OF THE DRAWINGS

FIG. 2 is a fragmentary plan view of the apparatus of FIG. 1.

FIG. 5 is a perspective view of the apparatus of FIG. 1 in its rolled-up configuration;

FIG. 6 is an enlarged simplified sectional view taken generally along line 6—6 in FIG. 5;

DETAILED DESCRIPTION OF THE INVENTION

Figure 1:
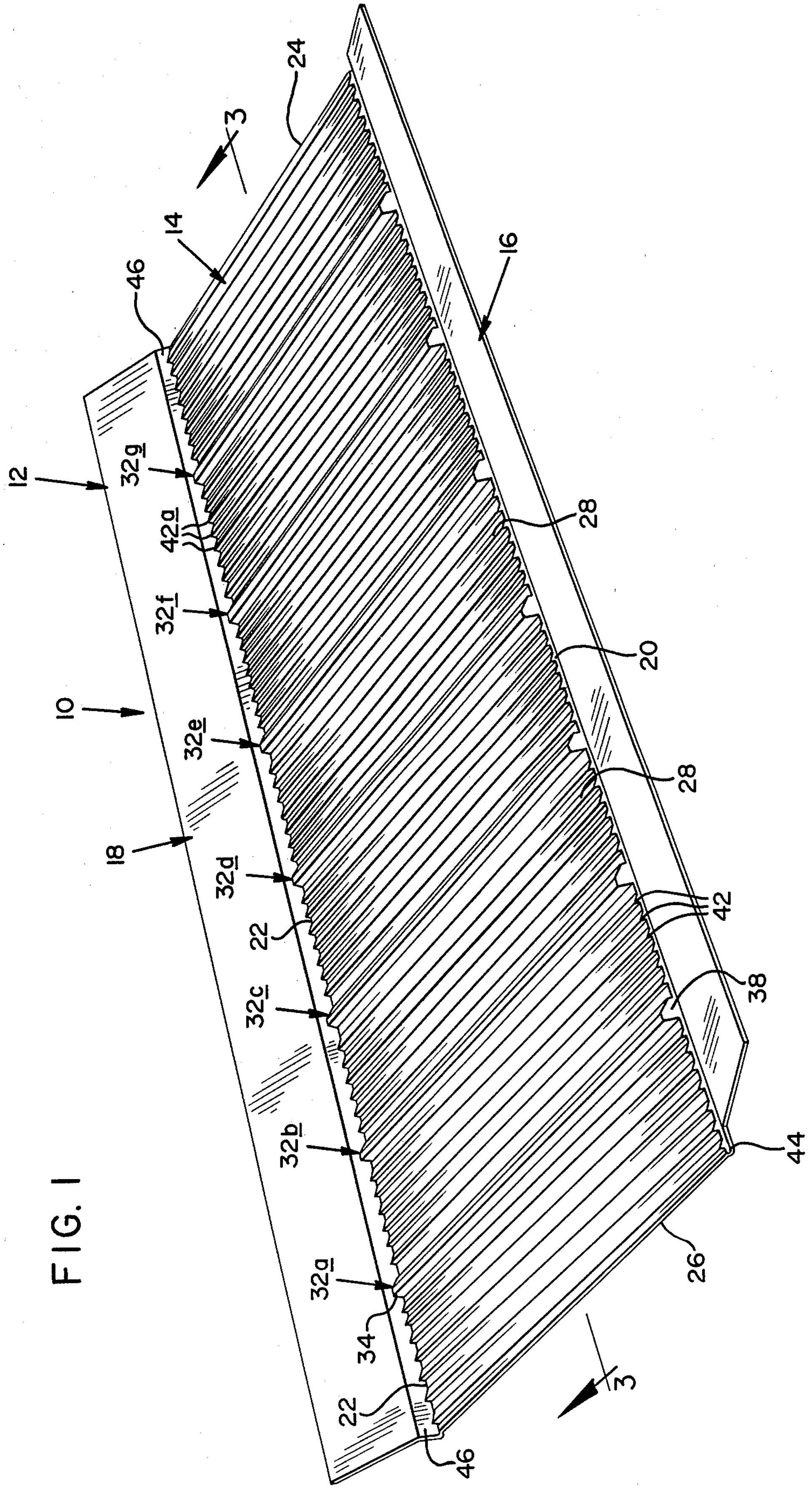
FIG. 1 is a perspective view of one embodiment of a sluice apparatus constructed according to the invention, shown in an unrolled and unfolded condition.
Figure 3:
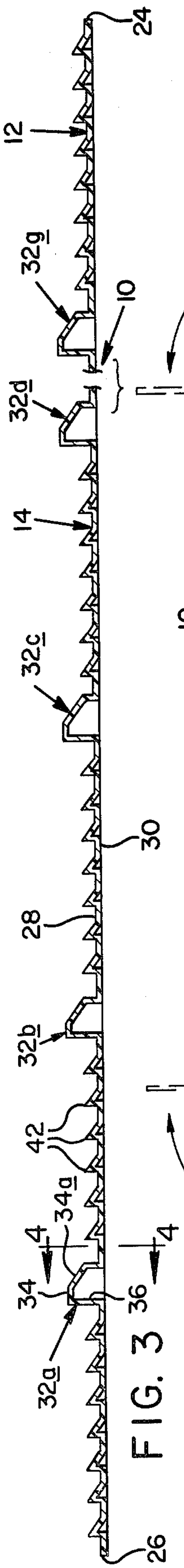
FIG. 3 is an enlarged longitudinal fragmentary sectional view taken generally along line 3—3 in FIG. 1.
Figure 4:
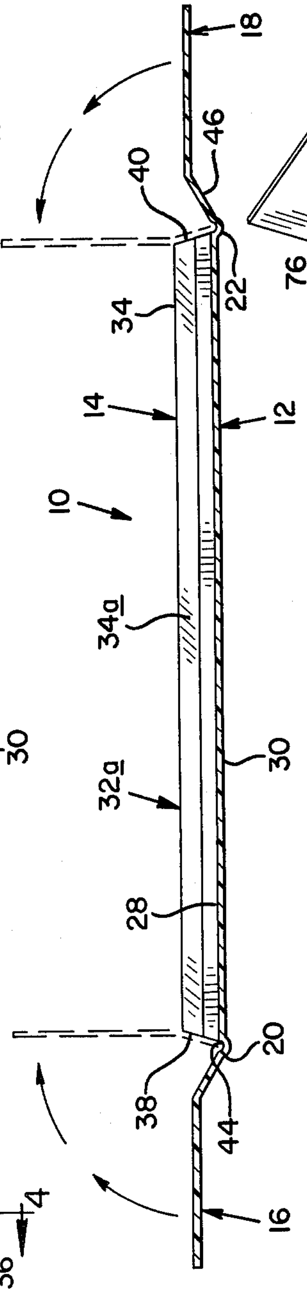
FIG. 4 is a sectional view, on about the same scale as FIG. 3, taken generally along line 4—4 in FIG. 3.

Looking at FIG. 1, there is shown generally at 10 a sluice apparatus constructed according to one embodiment of the invention. The apparatus includes a unitary roll-up fold-up elongate mat 12 having a riffled, central portion 14 and a pair of flaps 16, 18 flexibly joined to edges 20, 22, respectively, in the central portion. The mat has upstream and downstream ends 24, 26, respectively, and upper and lower sides 28, 30, respectively (FIGS. 3 and 4). The generally rectangular shape of the mat, with such in its rolled-out, folded-down condition, is seen in FIG. 2. Also, as seen in this figure, edges 20, 22 diverge somewhat progressing in an upstream direction along the mat.

Portion 14 has a riffled surface which functions to separate stream mineral sediments, such as gold, from less dense stream material, such as rocks and sand, under the action of water flow through the apparatus in a downstream direction. Specifically, the mat has formed therein plural longitudinally spaced, laterally extending riffles *32a*, *32b*, *32c*, *32d*, *32e*, *32f* and *32g*. Each riffle defines, on the upper side of the mat, an elongate, laterally extending ridge, such as ridge 34 in riffle *32a*, having the cross-sectional shape seen in FIG. 3. In particular, each ridge has an upstream wall, such as wall *34a* in ridge 34 (see FIGS. 3 and 4), which slopes upwardly progressing in a downstream direction. Also, defined by each riffle, on the lower side of the mat, is an elongate, laterally extending channel, such as channel 36 in riffle *32a*, each channel having substantially the same cross-sectional shape as the associated ridge. Each riffle is closed at its opposite ends by a pair of opposed end walls, such as end walls 38, 40 (FIG. 4) in riffle *32a*. The end walls in each riffle converge progressing upwardly from associated edges 20, 22, respectively, as can be seen in FIG. 4.

Formed in the mat, between each pair of riffles, is a group of subriffles, such as the group shown at 42 and the one shown at *42a* in FIG. 1. Adjacent riffles *32a*, *32b*, and the next adjacent upstream riffles *32b*, *32c*, are each longitudinally spaced by a distance corresponding to six subriffles. The subriffles in a group have a uniform longitudinal spacing, as can be seen in FIGS. 1-3. Adjacent riffles *32c*, *32d*, and the next adjacent upstream riffles *32d*, *32e*, are each longitudinally spaced by a distance corresponding to seven subriffles. Finally, adjacent riffles 32*e*, 32*f*, and the next adjacent riffles 32*f*, 32*g*, are each longitudinally spaced by a distance corresponding to eight subriffles.

Flaps 16, 18 are flexibly joined to portion 14, at the edges thereof, through grooved seams, such as seam 44 (FIG. 4) joining flap 16 to portion 14 along edge 20. The grooved seams accommodate folding of the flaps between folded-down positions, shown in solid lines in FIG. 4, and folded-up positions, shown in dashed lines in this figure. The flaps are angled in cross-section, as seen in FIG. 4, to produce abutment between a lower angled portion in each flap, such as angled portion 46 in flap 18, and associated end walls, such as wall 40, as can be appreciated best in FIG. 4.

Mat 12 is formed as a single-piece molded article from a polymer, such as polyethylene, which is flexible in sheet form. The thickness of the molded sheet material forming the mat is such as to impart substantial rigidity to the apparatus with such in its rolled-out folded-up configuration, yet provide sufficient flexibility in the mat's longitudinal direction to allow the mat to be folded down and rolled up in the manner now to be described.

To prepare for use, the mat is unrolled and the flaps are folded-up to positions where the lower angled portions of the flaps abut associated end walls in the mat riffles. The flaps may be held in their folded-up positions by rubber bands, string, or the like (not shown), looped around longitudinally spaced regions in the apparatus. The apparatus, when placed in a stream, functions conventionally to separate stream sediments by water flow through the elongate channel formed by the apparatus. Due to the relatively light weight of the mat, it may be desirable to anchor the apparatus in the stream by a large rock, weighted sack or the like.

To prepare the apparatus for carrying, the flaps are folded down and the unrolled mat is placed bottom side up. Referring now to FIGS. 5 and 6, the mat is then rolled in a manner which initially brings ridge 34 in riffle 32*a* into registry or nesting with the channel in riffle 32*c*. The upstream sloping surface of the channel in riffle 32*c*, which makes initial contact with ridge 34, acts to guide this ridge into a nested position in the channel during the rolling process, as can be appreciated in FIG. 6. Likewise, the converging end walls in riffle 32*a* are guided by the converging end walls in the somewhat longer riffle 32*c* to accommodate nesting of the two riffles.

Further rolling in this manner carries the ridge in riffle 32*b* into a nesting position in the channel in riffle 32*d*, and so forth, until the ridge in riffle 32*e* is received in the channel in riffle 32*g*, as shown in FIG. 6. As seen in this figure, nesting between alternate riffles occurs at substantially diametrically opposed positions in the roll as the mat is rolled up. It can also be appreciated in the figure that the increasing outer dimension of the roll is accommodated by the increasing longitudinal spacing between nesting pairs of riffles progressing from the mat's downstream end toward its upstream end, as brought out above.

Figure 7:
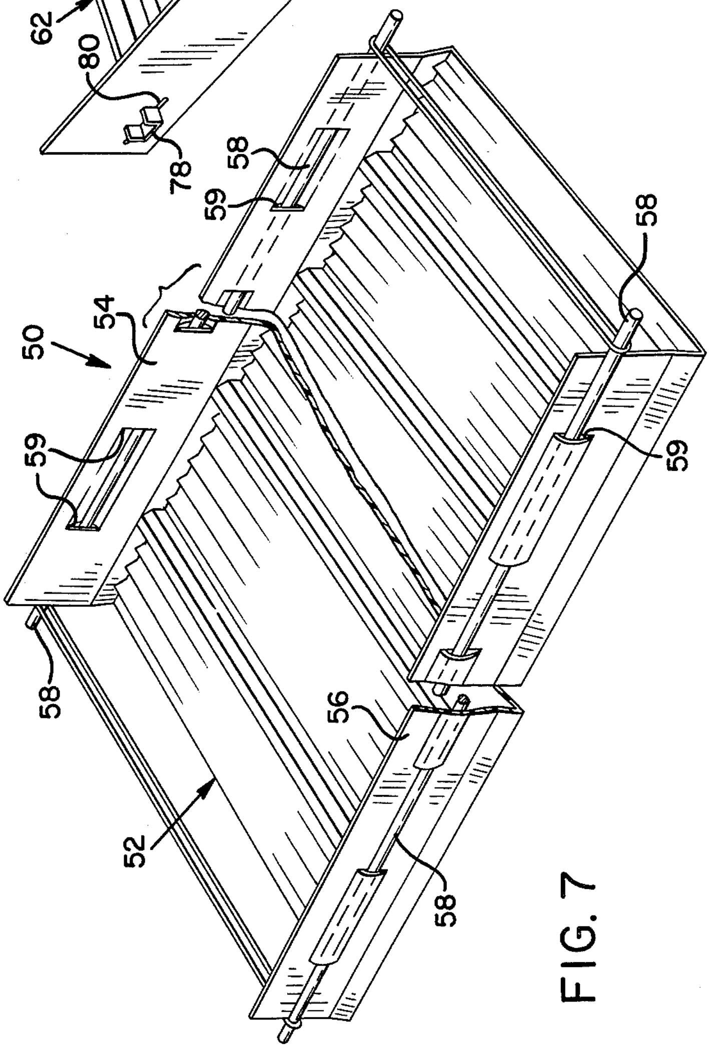
FIG. 7 is a top perspective view showing another embodiment of a sluice apparatus constructed according to the invention.

In FIG. 7 there is shown a sluice apparatus 50 constructed according to a second embodiment of the invention. The apparatus is composed of a mat 52 which is substantially identical to mat 12 in apparatus 10, except that two flaps 54, 56 in the mat are each adapted to have a bar, or stick, such as stick 58, fastened thereto. To this end, each flap, such as flap 54, has formed therein a plurality of slits, such as slits 59, through which the associated stick is threaded, in the manner indicated, to attach the stick to the flap. The flaps can then be held in their folded-up positions by fastening strings, rubber bands or the like around the outwardly projecting ends of the two sticks, as shown in the figure. With the sticks removed from the flaps, the apparatus can be rolled up in the manner described with reference to apparatus 10.

Figure 8:
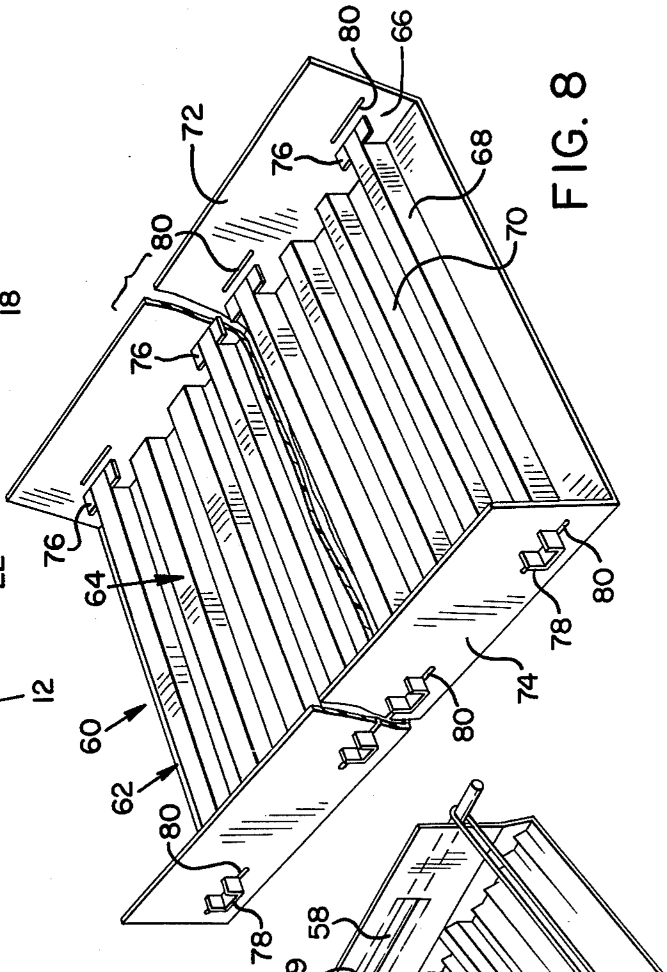
FIG. 8 is a view similar to FIG. 7 showing yet another embodiment of a sluice apparatus constructed according to the invention.

In FIG. 8 there is shown a sluice apparatus 60 constructed according to a third embodiment of the invention. Apparatus 60 is composed of a mat 62 whose central portion 64 is bordered by a pair of substantially parallel side edges, such as edge 66 visible in the figure. Formed in the mat's central portion are plural, longitudinally spaced riffles, such as riffles 68, 70, which extend substantially between the parallel side edges in the central portion. The ridges are open at their opposed ends, and define laterally extending ridges in the mat's upper surface and associated double-open-ended channels in the mat's lower surface. The riffles have generally rectangular cross-sectional shapes which have increasingly greater longitudinal dimensions progressing in an upstream direction in the mat (toward the top in FIG. 8) for accommodating a regular ridge-to-channel nesting between every third riffle in the mat. The riffles are also longitudinally spaced by increasing increments, progressing in the above direction in the mat, to accommodate such nesting as described with reference to apparatus 10. Two flaps 72, 74 in the mat are flexibly joined to portion 64 for swinging between folded-up and folded-down positions.

Beginning with riffle 68 at the bottom in FIG. 8, every third riffle in the mat has joined thereto a pair of opposed tabs, such as tabs 76, 78 in riffle 68. These tabs are adapted to be received in opposed pairs of longitudinally spaced slits formed in the two flaps, such as slits 80 formed in the flaps. The tabs, when received through the slits, can be bent upwardly as shown at the left in FIG. 8 to hold the flaps firmly against the ends of the riffles.

It can be appreciated from the above that the present invention provides a lightweight, single-piece sluice apparatus which can be rolled up into a compact, easily portable configuration. While preferred embodiments of the invention have been described herein, it will be obvious to those skilled in the art that various changes and modifications may be made without departing from the spirit of the invention.

It is claimed and desired to secure by Letters Patent:

1. Unitary roll-up fold-up sluice apparatus for use in separating sediment by water flow comprising an elongate flexible mat having upper and lower sides, means distributed along a central portion in said mat forming plural longitudinally spaced riffles which extend substantially laterally with respect to the mat's long axis and between the central portion's opposed longitudinal edges, each riffle defining an elongate ridge on said upper side and an elongate channel on said lower side, said riffles being dimensioned and longitudinally spaced for accommodating a regular ridge-to-channel nesting when said mat is rolled up in one longitudinal direction relative to the mat's long axis, with the riffles being spaced longitudinally by increasing increments progressing in said one longitudinal direction along said central portion, and longitudinally extending flaps joined integrally with said edges for folding between upwardly extending positions to form sides in the apparatus, and outwardly extending positions to accommodate rolling up of the mat.

2. The apparatus of claim 1, wherein said riffles include end and side walls which converge, respectively, progressing upwardly away from said upper side.

3. The apparatus of claim 1, wherein said riffles are open ended, and include rectilinear cross sections of progressively larger sizes progressing along said central portion in said one longitudinal direction.

4. The apparatus of claim 1, wherein said riffles have increasing lateral dimensions progressing in said one direction.

5. The apparatus of claim 2, wherein said flaps are angled in cross section to include flap expanses which abut associated end walls in said riffles when said flaps are in their upwardly extending positions.

6. The apparatus of claim 1, which further includes means defining slits in said flaps, and tab means joined to said riffles and projecting laterally outwardly therefrom adapted to engage said slits for holding said flaps in their upwardly extending positions.

* * * * *